(12) United States Patent
Kaida

(10) Patent No.: US 10,282,880 B2
(45) Date of Patent: May 7, 2019

(54) IMAGE PROCESSING APPARATUS THAT PERFORMS AN ALIGNMENT PROCESS ON A PLURALITY OF IMAGES, A RELATED CONTROL METHOD, AND A RELATED STORAGE MEDIUM THAT STORES A CONTROL PROGRAM

(71) Applicant: CANON KABUSHIKI KAISHA, Tokyo (JP)

(72) Inventor: Hironori Kaida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/611,837

(22) Filed: Jun. 2, 2017

(65) Prior Publication Data
US 2017/0358115 A1    Dec. 14, 2017

(30) Foreign Application Priority Data
Jun. 10, 2016    (JP) .................................. 2016-116119

(51) Int. Cl.
*G06T 3/00* (2006.01)
*G06T 11/60* (2006.01)
(Continued)

(52) U.S. Cl.
CPC ............ *G06T 11/60* (2013.01); *G06T 3/0068* (2013.01); *G06T 7/30* (2017.01); *G06T 7/32* (2017.01);
(Continued)

(58) Field of Classification Search
CPC ........... G06T 11/60; G06T 2207/10016; G06T 2207/20021; G06T 200/32; G06T 7/33;
(Continued)

(56) References Cited

U.S. PATENT DOCUMENTS

| 9,210,408 B2 | 12/2015 | Ooshima |
| 2013/0329072 A1* | 12/2013 | Zhou ...................... G06T 3/4038 348/222.1 |

(Continued)

FOREIGN PATENT DOCUMENTS

| JP | 2014-219725 A | 11/2014 |
| WO | 2011/162227 A1 | 12/2011 |

*Primary Examiner* — Ali Bayat
(74) *Attorney, Agent, or Firm* — Venable LLP

(57) ABSTRACT

An image processing apparatus includes a memory configured to store instructions, and a processor in communication with the memory. The processor is configured to execute the instructions to set up a plurality of image sets according to a predetermined rule using a plurality of images obtained by continuous photography, to calculate a first conversion coefficient corresponding to a moving amount of an object between images in each of the plurality of image sets, to calculate a second conversion coefficient used for an alignment process about a correction target image other than a base image included in the plurality of images by multiplying a plurality of first conversion coefficients, and to generate an alignment image in which the object in the correction target image is aligned to the object in the base image by applying a conversion process to the correction target image using the second conversion coefficient.

27 Claims, 15 Drawing Sheets

(51) Int. Cl.
*G06T 7/30* (2017.01)
*G06T 7/32* (2017.01)

(52) U.S. Cl.
CPC ............. *G06T 2200/32* (2013.01); *G06T 2207/10016* (2013.01); *G06T 2207/20021* (2013.01)

(58) Field of Classification Search
CPC .... G06T 7/32; G06T 7/30; G06T 7/70; G06T 3/0068; G06K 2009/2045
See application file for complete search history.

(56) References Cited

U.S. PATENT DOCUMENTS

| | | | |
|---|---|---|---|
| 2015/0042786 A1* | 2/2015 | Han | G06T 7/74 348/95 |
| 2015/0229840 A1* | 8/2015 | Sawai | G06T 3/4038 348/36 |
| 2016/0328827 A1* | 11/2016 | Ilic | H04N 5/2624 |
| 2017/0048458 A1* | 2/2017 | Jeon | H04N 5/23267 |
| 2017/0150054 A1 | 5/2017 | Kaida | |

* cited by examiner

POSITIONAL RELATIONSHIP IN HORIZONTAL DIRECTION

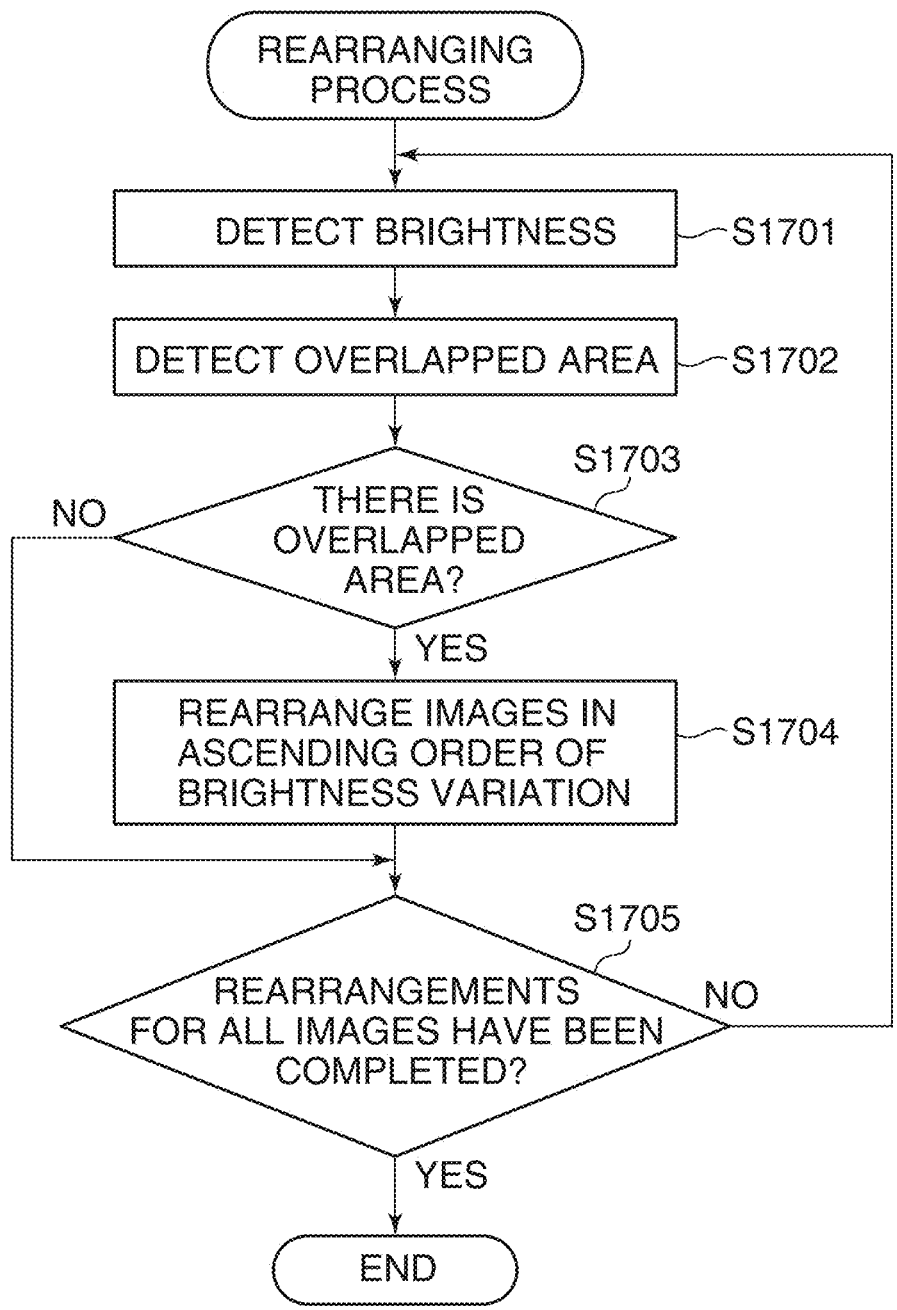

IMAGE PROCESSING APPARATUS THAT PERFORMS AN ALIGNMENT PROCESS ON A PLURALITY OF IMAGES, A RELATED CONTROL METHOD, AND A RELATED STORAGE MEDIUM THAT STORES A CONTROL PROGRAM

This application claims the benefit of Japanese Patent Application No. 2016-116119, filed Jun. 10, 2016, which is hereby incorporated by reference herein in its entirety.

BACKGROUND OF THE INVENTION

Field of the Invention

The present invention relates to an image processing apparatus, a related control method, and a related storage medium that stores a control program for an image processing apparatus, and, in particular, relates to an image retrieval apparatus that performs an alignment process on a plurality of images.

Description of the Related Art

In general, an image pickup apparatus, such as a digital camera, performs an alignment process for correcting a deviation between images that occurs due to a user's camera shake or a panning operation (for example, panoramic photographing or panning photographing). For example, there is a known image pickup apparatus that detects moving amounts of an object among a plurality of images during a panning operation, and generates a panoramic image by performing a composition process so as to align the position of the object according to the moving amounts (see WO 2011/162227).

Furthermore, there is a known technique for taking a plurality of images while focusing on objects of which distances from a camera differ (objects of which focusing distances differ) in order, and for aligning and compositing these images to generate a full focus image in which all the objects are focused.

Incidentally, when moving amounts of a background become large among a plurality of images, a subsequent alignment process is performed using an image after alignment as a reference image in the above-mentioned publication. Accordingly, when alignment accuracy is poor in a past frame (i.e., an image), deviation occurs in the reference image itself.

As a result, subsequent alignment accuracy will also be lowered. Furthermore, when a full focus image would be generated, it is necessary to align images of which focusing distances differ largely while the moving amounts of the background are small.

SUMMARY OF THE INVENTION

The present invention provides an image processing apparatus, a control method for controlling an image processing apparatus, and a storage medium storing a control program for controlling an image processing apparatus, each of which is capable of performing an alignment process with sufficient accuracy, even if a moving amount of an object is large among a plurality of images.

A first aspect of the present invention provides an image processing apparatus including a setting unit configured to set up a plurality of image sets according to a predetermined rule using a plurality of images obtained by continuous photography, a first calculation unit configured to calculate a first conversion coefficient corresponding to a moving amount of an object between images in each of the plurality of image sets, a second calculation unit configured to calculate a second conversion coefficient used for an alignment process about a correction target image other than a base image included in the plurality of images by multiplying a plurality of first conversion coefficients, and a generation unit configured to generate an alignment image in which the object in the correction target image is aligned to the object in the base image by applying a conversion process to the correction target image using the second conversion coefficient.

A second aspect of the present invention provides a control method for an image processing apparatus, the control method including a setting step of setting up a plurality of image sets according to a predetermined rule using a plurality of images obtained by continuous photography, a first calculation step of calculating a first conversion coefficient corresponding to a moving amount of an object between images in each of the plurality of image sets, a second calculation step of calculating a second conversion coefficient used for an alignment process about a correction target image other than a base image included in the plurality of images by multiplying a plurality of first conversion coefficients, and a generation step of generating an alignment image in which the object in the correction target image is aligned to the object in the base image by applying a conversion process to the correction target image using the second conversion coefficient.

A third aspect of the present invention provides a non-transitory computer-readable storage medium storing a control program causing a computer to execute the control method of the second aspect.

According to the present invention, the alignment process is performed with sufficient accuracy, even if a moving amount of an object is large among a plurality of images.

Further features of the present invention will become apparent from the following description of exemplary embodiments with reference to the attached drawings.

BRIEF DESCRIPTION OF THE DRAWINGS

FIG. 8 is a flowchart showing a process at a time of rearranging images shown in FIG. 7B.

DESCRIPTION OF THE EMBODIMENTS

Hereafter, image processing apparatuses according to embodiments of the present invention will be described in detail with reference to the drawings.

Figure 1:
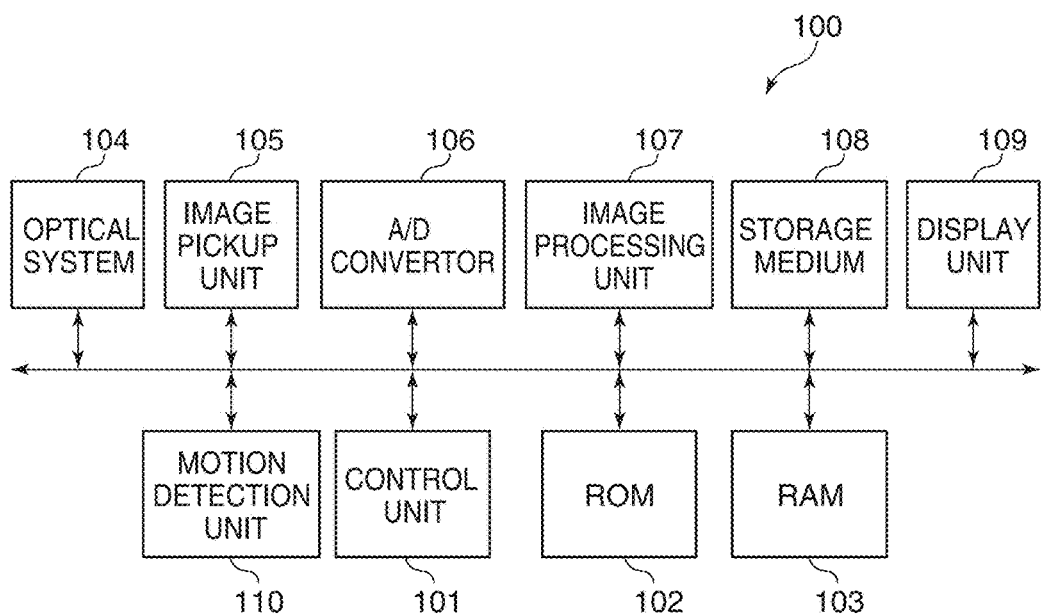
FIG. 1 is a block diagram schematically showing a configuration of an image pickup apparatus (a camera) as an image processing apparatus according to a first embodiment of the present invention.

FIG. 1 is a block diagram schematically showing a configuration of an image pickup apparatus as an image processing apparatus according to a first embodiment of the present invention.

The illustrated image pickup apparatus is a digital camera (also simply referred to as a "camera"), for example, and has a control unit 101, such as a central processing unit (CPU). The control unit 101 reads an operation program for the camera 100 from a read-only memory (ROM) 102, develops it to a random access memory (RAM) 103, and controls the camera 100 by running the operation program. The ROM 102 is a rewritable nonvolatile memory, for example, and stores parameters required for the operation of the camera 100, etc., in addition to the operation program. The RAM 103 is a rewritable volatile memory, and is used as a temporary storage area storing data obtained in the operation of the camera 100.

An optical system 104 forms an object image (optical image) on an image pickup unit 105. The image pickup unit 105 is provided with an image pickup device, such as a couple-charged device (CCD) sensor, or a complementary metal-oxide semiconductor (CMOS) sensor. The image pickup unit 105 photoelectrically converts the optical image formed on the image pickup device, and outputs an analog image signal to an analog/digital (A/D) convertor 106. The A/D convertor 106 stores image data obtained by applying an A/D conversion process to the analog image signal to the RAM 103.

An image processing unit 107 applies predetermined image processing, such as white balance adjustment, color interpolation, and filtering, to the image data stored in the RAM 103. A storage medium 108 is a memory card, etc., that is detachable from the camera 100. The image data obtained through the image processing by the image processing unit 107 and the image data obtained through the A/D conversion process by the A/D convertor 106 are recorded on the storage medium 108 as recorded images. A display unit 109 is a display device, such as an LCD. An image corresponding to image data obtained by the A/D convertor 106 is displayed on the display unit 109.

A motion detection unit 110 is a device, such as a gyro sensor, that detects a motion, and detects motions of the camera 100 in a yaw direction and a pitch direction on the basis of angle variations of the camera 100 per unit time (i.e., angular velocities). In the illustrated example, images are taken while panning or tilting the camera 100. Then, positions of background parts (background objects) are aligned among a plurality of images as described herein.

Figure 2A:
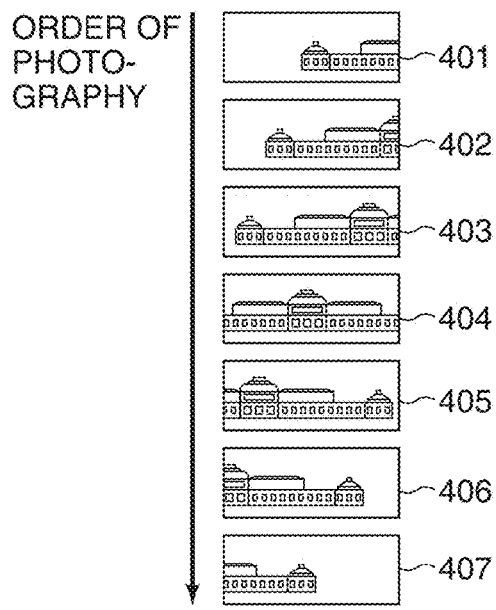
FIG. 2A, FIG. 2B, and FIG. 2C are views for describing an alignment process performed by the camera shown in FIG. 1.
Figure 2C:
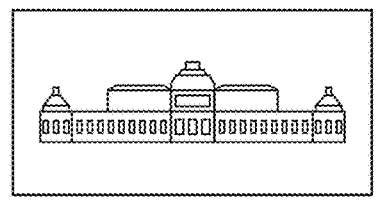
Figure 2B:
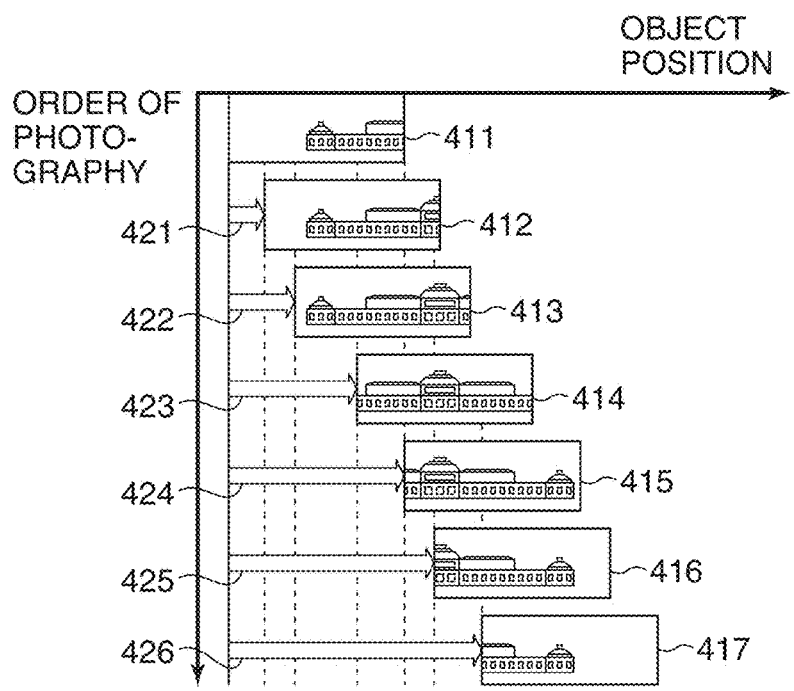

FIG. 2A, FIG. 2B, and FIG. 2C are views for describing an alignment process performed by the camera shown in FIG. 1. That is, FIG. 2A is a view showing a plurality of images obtained by the camera. FIG. 2B is a view showing the images of which positions have been corrected according to object positions in order to composite the images shown in FIG. 2A. Moreover, FIG. 2C is a view showing a composite image obtained by compositing the corrected images shown in FIG. 2B.

The images 401 through 407 shown in FIG. 2A are obtained as a result of photography while panning the camera 100. Then, these images 402 through 407 are corrected according to the object positions to become the post-correction images 412 through 417 as described herein. It should be noted that the position of the image 411 corresponding to the image 401 is not corrected. Moving amounts 421 through 426 due to the panning operation are found, and the positions of the images 402 through 407 are corrected according to the moving amounts 421 through 426 to obtain the post-correction images 412 through 417 (see FIG. 2B). Then, the composite image (panoramic image) shown in FIG. 2C is obtained using the post-correction images 411 through 417.

Figure 3:
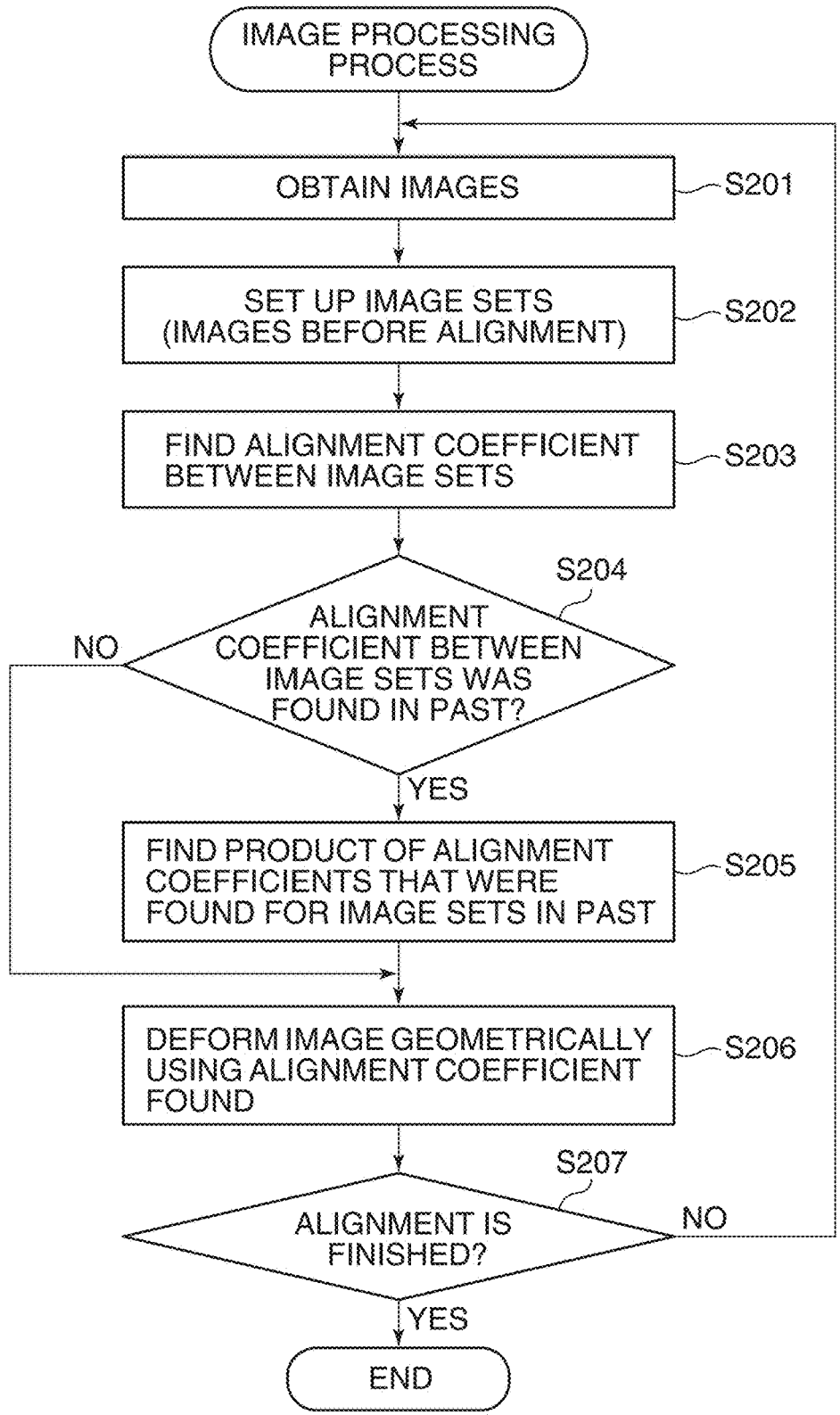
FIG. 3 is a flowchart showing an image processing process performed by the camera shown in FIG. 1.

FIG. 3 is a flowchart showing an image processing process performed by the camera 100 shown in FIG. 1. It should be noted that the process concerning the illustrated flowchart is performed under the control of the control unit 101. Moreover, the process concerning the illustrated flowchart is performed when the camera 100 obtains a second image. Furthermore, a user shall take a plurality of images while performing a panning operation in the description.

The control unit 101 controls the image pickup unit 105 to obtain a plurality of images with the image pickup unit 105 (step S201). In the step S201, the control unit 101 sends an image acquisition request to the image pickup unit 105, and receives and obtains the image that the image pickup unit 105 sends in response to the request.

Subsequently, the control unit 101 sets up an image set of a pair of images as a group for measuring a positional relationship between an alignment target image (a correction target image) and a temporally last image (referred to as a frame) in step S202. An image set consists of two images, and a last image (past image) becomes a reference image for alignment. For example, when the image 402 shown in FIG. 2A is the correction target image, the image 401 becomes the reference image. Similarly, the image 402 becomes the reference image in the image set consisting of the images 402 and 403, and the image 403 becomes the reference image in the image set consisting of the images 403 and 404. Then, the control unit 101 finds an alignment coefficient between the image sets (step S203).

Figure 4:
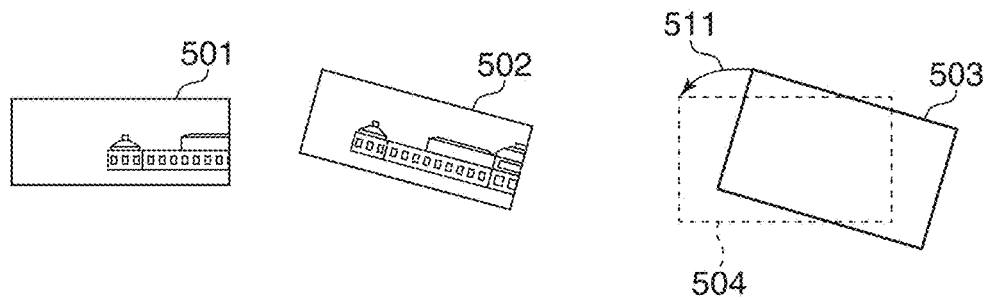
FIG. 4 is a view for describing an alignment coefficient calculated by the camera shown in FIG. 1.

FIG. 4 is a view for describing the alignment coefficient calculated by the camera shown in FIG. 1.

A reference image 501 and a correction target image 502 are an image set obtained by the process in the step S202. The correction by the alignment does not aim at only a translation component corresponding to the camera motion by the panning operation shown in FIG. 2B. In addition to the translation component, there are a rotation component and a tilting component due to a camera shake. As a result, an image, like the image 502, that was subject to the effects of rotation and tilt may be obtained. Accordingly, the control unit 101 finds a conversion coefficient for correcting a translation component, a rotation component, and a tilting component by geometric deformation. The conversion coefficient for performing this geometric deformation is called the alignment coefficient.

For example, as shown in FIG. 4, it is necessary to deform the correction target image 503 that was subject to the effects of the translation component, the rotation component, and the tilting component to the image 504 geometrically. When performing this geometric deformation, the alignment coefficient 511 is used. When the alignment coefficient 511 is denoted by a matrix A, the matrix A is denoted by the following formula (1):

$$A = \begin{pmatrix} a & b & c \\ d & e & f \\ g & h & i \end{pmatrix}. \quad (1)$$

When a coordinate in the correction target image shall be I (x, y) and a coordinate in the image after the geometric deformation shall be I' (x', y'), the image 503 is geometrically deformed to the image 504 by performing the geometric deformation according to the following formula (2):

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix}. \quad (2)$$

Subsequently, the control unit 101 determines whether the alignment coefficient was found at least once in the past (step S204). When the alignment coefficient was found at least once in the past (YES in the step S204), the control unit 101 finds a product of the alignment coefficients that were found for image sets in the past and the current alignment coefficient found (step S205).

Figure 5:
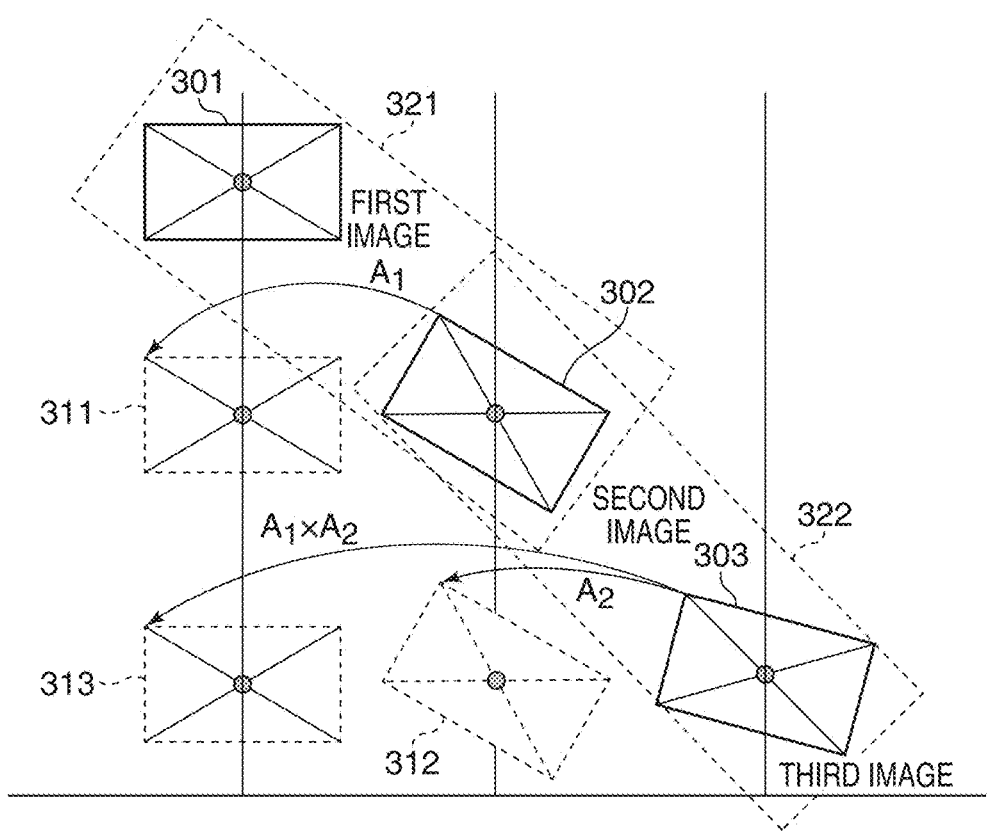
FIG. 5 is a view for describing a process for finding a product of the alignment coefficients in step S205 in FIG. 3.

FIG. 5 is a view for describing a process for finding the product of the alignment coefficients in the step S205 in FIG. 3.

Images 301, 302, and 303 are obtained by panning the camera 100. In FIG. 5, a horizontal axis shows horizontal positional relationship between images. The images 301, 302, and 303 are taken in order while moving the camera 100 rightward. An image set 321 includes the images 301 and 302, and an image set 322 includes the images 302 and 303.

In the image set 321, the alignment coefficient for correcting the image 302 to the position of the image 301 (a post-correction image 311 corresponds to the image 301) shall be A1. Similarly, in the image set 322, the alignment coefficient for correcting the image 303 to the position of the image 302 (a post-correction image 312 corresponds to the image 302) shall be A2. Since there is no image set before the image set 321, the product of the alignment coefficients is not found about the image set 321. Since there is the previous image set 321 about the image set 322, the product of the alignment coefficient found about the previous image set 321 and the alignment coefficient of the current image set 322 is found according to the following formula (3):

$$A_1 A_2 = \begin{pmatrix} a_1 & b_1 & c_1 \\ d_1 & e_1 & f_1 \\ g_1 & h_1 & i_1 \end{pmatrix} \begin{pmatrix} a_2 & b_2 & c_2 \\ d_2 & e_2 & f_2 \\ g_2 & h_2 & i_2 \end{pmatrix}. \quad (3)$$

The image 303 is corrected to the position with reference to the image 301 (a post-correction image 313 corresponds to the image 301) by finding the product of the alignment coefficients according to the formula (3).

Next, the control unit 101 geometrically deforms the correction target image with the image processing unit 107 using the alignment coefficient found as described above (step S206). The geometric deformation is performed using the alignment coefficient found by the process up to the step S205 according to the formula (2), described above. When no alignment coefficient has been found in the past (NO in the step S204), the control unit 101 proceeds with the process to the step S206 without calculating a product.

Subsequently, the control unit 101 determines whether the alignment of images is finished (step S207). In the step S207, the control unit 101 determines the end of the alignment of images on the basis of whether the following image is obtained by the image pickup unit 105. When the following image is not obtained (YES in the step S207), the control unit 101 finishes the image processing process. On the other hand, when the following image is obtained (NO in the step S207), the control unit 101 returns the process to the step S201.

Figure 6A:
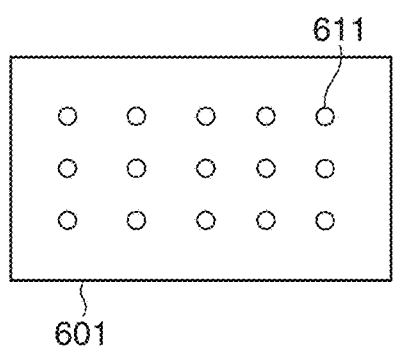
FIG. 6A, FIG. 6B, and FIG. 6C are views for describing the process for calculating the alignment coefficient in step S203 in FIG. 3.
Figure 6B:
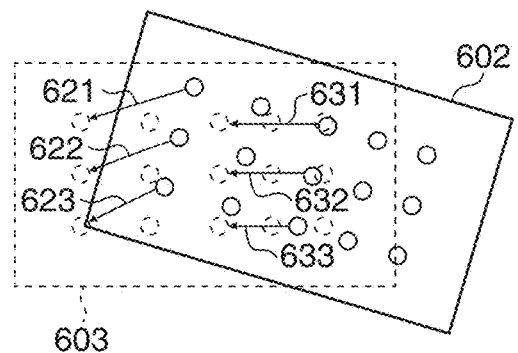
Figure 6C:
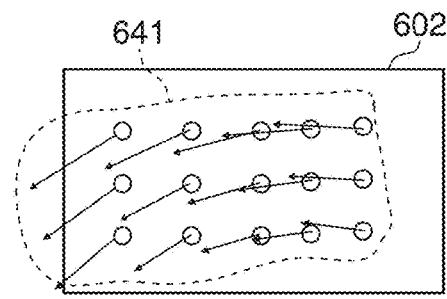

FIG. 6A, FIG. 6B, and FIG. 6C are views for describing the process for calculating the alignment coefficient in the step S203 in FIG. 3. That is, FIG. 6A is a view showing feature points set in an image, and FIG. 6B is a view showing a correction target image and a reference image. Moreover, FIG. 6C is a view showing a group of vectors corresponding to the feature points.

In order to calculate the alignment coefficient, a reference image and a correction target image are set up as an image set. In the image set concerned, the reference image is a last frame of the correction target image in photography time. Then, vectors (a vector group) are calculated as feature amounts for respective areas in the two images of the image set by finding moving directions and moving amounts of feature points (or feature regions) in the respective areas. After that, a geometric conversion coefficient that indicates the positional relationship (for example, translation, rotation, reduction, and enlargement) between the two images based on the vectors concerned is found as the alignment coefficient.

As shown in FIG. 6A, the feature points 611 are uniformly set up in the image 601. For example, blocks may be set up in the image at regular intervals as the feature points 611. In such a case, when each block preferably includes an edge part and a texture containing frequency components from a low frequency to a high frequency, a vector is accurately found in the image set.

As shown in FIG. 6B, positions of feature points in the correction target image 602 corresponding to the feature points 611 in the reference image 601 are found. And then, the moving directions and the moving amounts of the feature points in the correction target image 602 with respect to the feature points 611 in the reference image 601 are calculated.

For example, the feature amounts 621, 622, 623, 631, 632, and 633 are vectors that indicate the directions and the moving amounts. Similarly, vectors are calculated also to the remaining feature points. It should be noted that a vector group 641 in FIG. 6C is calculated for the predetermined feature points.

Generally, what is called a block matching method is used as a method of finding correlation between feature points of two images. The block matching method is able to detect a hierarchy vector by performing block matching about not only equal-magnification images but also gradually reduced images. The hierarchical detection of a vector enables reduction of the processing time required to detect a vector, even if a search area spreads.

Subsequently, the geometric conversion coefficient is found using the vector group found as mentioned above. For example, a coordinate (x'1, y'1, 1) shall indicate a feature point in a reference image, and a coordinate (x1, y1, 1) shall indicate a feature point in a correction target image. In this case, the vector X1 has information including the coordinate (x'1, y'1, 1) and the coordinate (x1, y1, 1) in a three-dimensional coordinate system. Then, a coordinate X is found by multiplying a predetermined conversion coefficient A to a coordinate X of a feature point in a correction target image according to formula (4), below. Then, an actual conversion coefficient A that minimizes the difference between the coordinate X' concerned and the coordinate X of the feature point in the reference image is found.

$$X' = AX = \begin{pmatrix} a & b & c \\ d & e & f \\ g & h & i \end{pmatrix} X. \quad (4)$$

A known optimization method, such as a Newton's method or a Gaussian Newton's method, is used for finding the conversion coefficient A. Then, this conversion coefficient A is used as the alignment coefficient.

Thus, since the conversion coefficient is found with respect to the last image, the alignment coefficient is found by images between which the deformation amount is relatively small even in a scene with a large panning operation of the camera 100. This enables a high-precision alignment process.

Although the alignment method that uses a correction target image and a past image (last frame) in time series as an image set has been described in the embodiment, other images may be selected as an image set. For example, two images between which brightness variation, a moving amount, a change of a blur of an object image, or a change of defocus of an object image is small may be selected as an image set.

When a plurality of image sets is set up about a plurality of images, there is a method of setting an image set by selecting two images that are temporally close to each other from the plurality of images arranged in the order of image pickup, for example. Furthermore, there is a method of changing the order of the images according to the amount of change between images, and setting an image set by selecting two images that are close to each other in the changed order. This method corresponds to setting of an image set according to a predetermined rule.

Figure 7A:
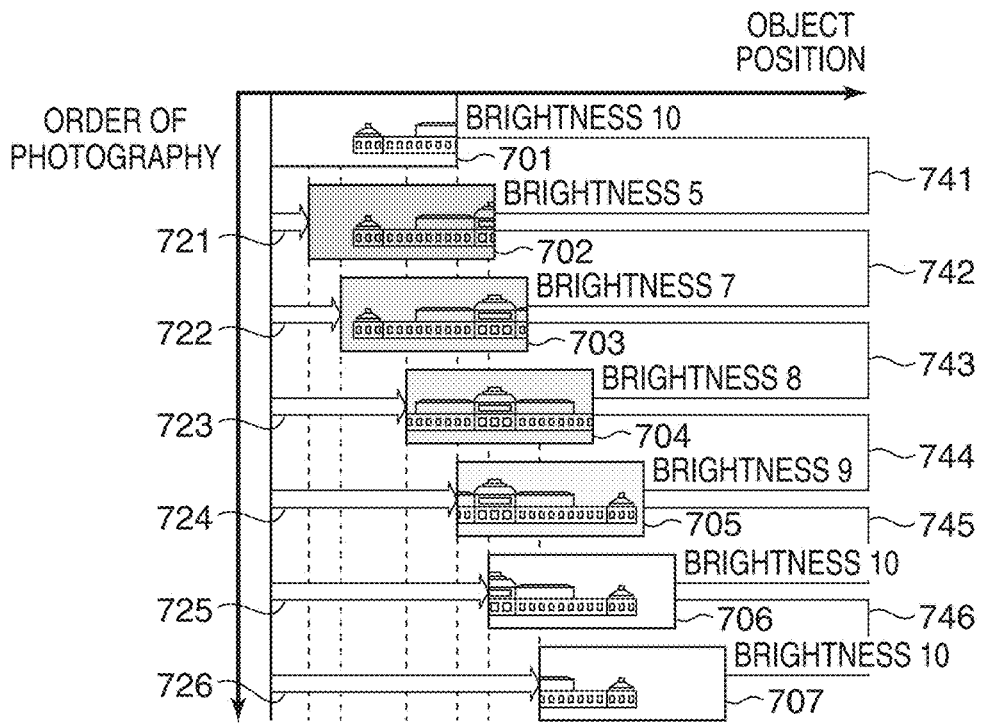
FIG. 7A and FIG. 7B show examples of selections of image sets in the camera shown in FIG. 1.
Figure 7B:
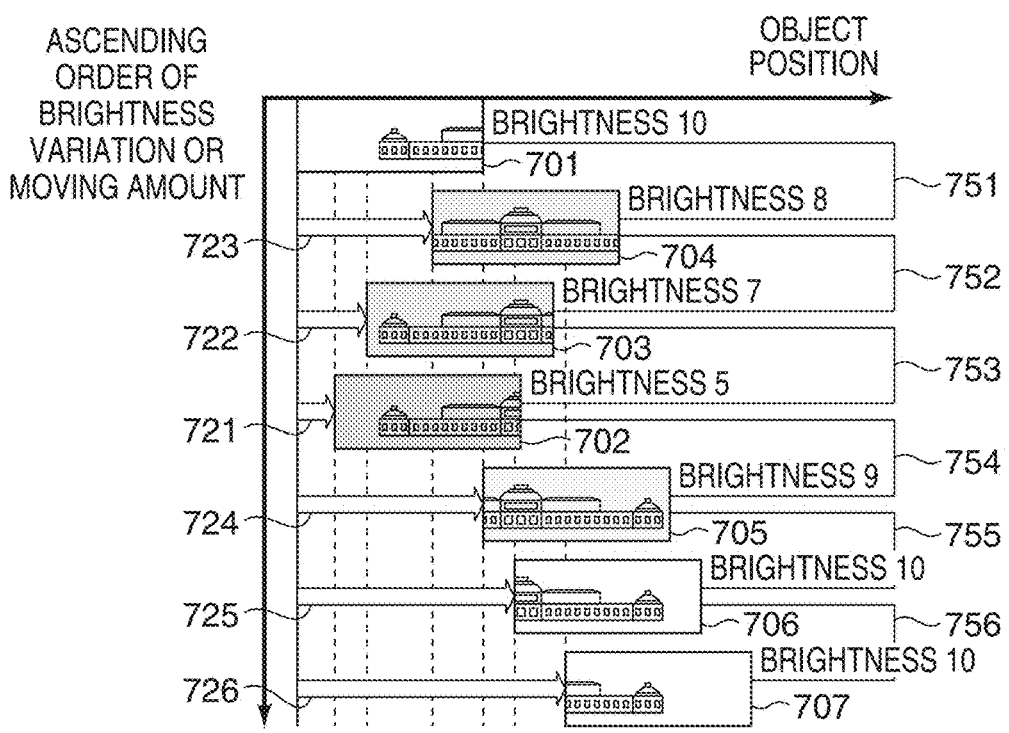

FIG. 7A and FIG. 7B are views for describing examples of selections of image sets. FIG. 7A shows an example in which image sets are selected from images arranged in order of photography. FIG. 7B shows an example in which image sets are selected from images arranged in ascending order of brightness variation and a moving amount with reference to a first image.

Moving amounts 721 through 726 from a head image (first image) for aligning the images with the same object are shown in FIG. 7A. Moreover, images 701 through 707 shown in FIG. 7A and FIG. 7B are taken while a user pans the camera 100. In FIG. 7A, the order of photography and the moving amounts of the object in the images have correlation, and the images are arranged so that a moving amount becomes greater as image pickup time becomes later. As mentioned above, the image sets 741 through 746 are set up in the order of photography.

On the other hand, when the brightness varies between frames, the accuracy of alignment may improve by selecting an image set in consideration of brightness and moving amount. For example, in the case of panoramic photography, an AE value is fixed to a value for a first image in order not to enlarge brightness variation for each image.

When clouds cover the sun suddenly or when the user brings the camera 100 to a shadow area from a sunny area during photography, a scene becomes dark for a moment in a series of images taken continuously. Then, the camera is set so as to be suitable for the scene concerned, and a series of images are taken. Since the brightness varies between frames in such a series of scenes, the alignment accuracy for every image set may deteriorate due to the brightness variation when image sets are set up in order of photography. Accordingly, in the example shown in FIG. 7B, an image set is set up so that the brightness variation becomes small with respect to the head image 701.

In FIG. 7B, the order of the images 702, 703, and 704 is changed so that the brightness variation becomes small with respect to the head image 701. In the description, brightness of an image is indicated within a range of "0" through "10".

FIG. 8 is a flowchart showing a process at a time of rearranging images shown in FIG. 7B. In the description, the first image in the order of photography is used as a base image for alignment.

The control unit 101 detects the brightness of the second image (step S1701). Subsequently, the control unit 101 detects an overlapped area between the base image (the head image in this example) and the second image (step S1702). Then, the control unit 101 determines whether there is an overlapped area between the base image and the second image (step S1703).

When there is an overlapped area (YES in the step S1703), the control unit 101 finds luminance variation (brightness variation) between the base image and the second image concerned to rearrange the images (step S1704). After that, the control unit 101 determines whether the rearrangements for all the images have been completed (step S1705). When the rearrangements for all the images have been completed (YES in the step S1705), the control unit 101 finishes the rearrangement process. On the other hand, when the rearrangements for not all the images have been completed (NO in the step S1705), the control unit 101 returns the process to the step S1701 and detects brightness of the following image. When there is no overlapped area (NO in the step S1703), the control unit 101 proceeds with the process to the step S1705 without rearranging images.

As shown in FIG. 7B, since the brightness of the image 702 is "5" and the brightness of the head image 701 is "10", the brightness variation is large. Accordingly, in the example in FIG. 7B, the image 702 with the brightness "5" is rearranged to the fourth position and the image 704 with the brightness "8" is rearranged to the second position.

On the other hand, although the brightness variations of the images 705, 706, and 707 with respect to the head image 701 are small, they do not have an overlapped area including the same object. Accordingly, since the alignment coefficient is incomputable, the images 705, 706, and 707 are not rearranged.

It should be noted that the moving amount may be used for determining whether there is an overlapped area. That is, when the moving amount is greater than a predetermined amount, it may be determined that there is no overlapped area.

Furthermore, when the overlapped area between the last image and the base image is narrower than the overlapped area between the following image and the base image, and when the difference between both the overlapped areas is greater than a predetermined threshold, it may be determined that there is no overlapped area between the following image and the base image.

Thus, the image sets 751 through 756 are obtained by rearranging the images using the brightness variations and the moving amounts of the images. Similarly, a blur or defocus of an image may be used as a determination factor instead of brightness when an image set is determined. In such a case, images between which difference in a blur or a defocus is small are set up as an image set.

Moreover, although the head image is used as the base image for alignment in the description, the base image may be changed according to an alignment coefficient found between image sets (i.e., according to a predetermined condition).

Figure 9A:
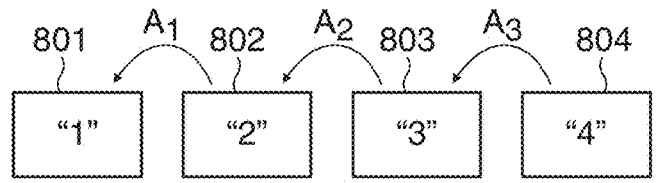
FIG. 9A through FIG. 9E are views for describing a change of a base image for alignment in the camera shown in FIG. 1.
Figure 9B:
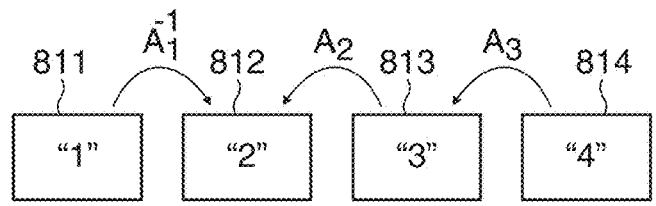
Figure 9C:
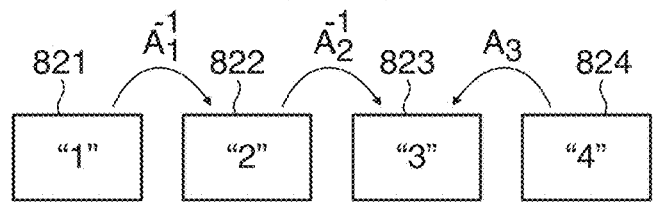
Figure 9D:
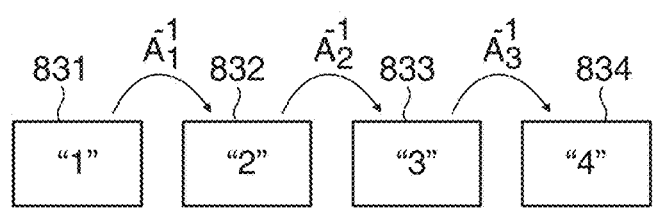
Figure 9E:
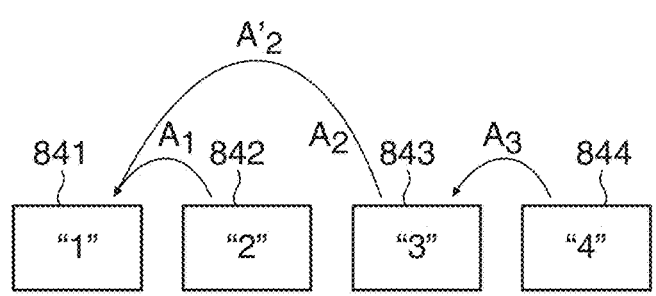

FIG. 9A through FIG. 9E are views for describing change of the base image for alignment in the camera 100 shown in FIG. 1. FIG. 9A is a view showing an example in a case of aligning other images with a first image as the base image. FIG. 9B is a view showing an example in a case of aligning other images with a second image as the base image. Moreover, FIG. 9C is a view showing an example in a case of aligning other images with a third image as the base image. FIG. 9D is a view showing an example in a case of aligning other images with a fourth image as the base image. Furthermore, FIG. 9E is a view showing an example of change of the base image.

In FIG. 9A, numbers "1" through "4" show the order of photography of images 801 through 804. Moreover, an arrow in the drawings shows a direction of alignment of an image. Then, a tip of an arrow shows a base image for alignment and a root of an arrow shows an alignment target image. Furthermore, the alignment coefficients corresponding to the arrows are shown by $A_1$, $A_2$, and $A_3$ (inverse matrices are $A_1^{-1}$, $A_2^{-1}$, and $A_3^{-1}$).

In the example shown in FIG. 9A, the images 802, 803, and 804 are aligned to the first image 801 as the base image. Transformation matrices (alignment coefficients) $A_{801}$ through $A_{804}$ for aligning the images 801 through 804 are shown by the following formulas (5):

$$A_{801}=1$$

$$A_{802}=A_1$$

$$A_{803}=A_1 A_2$$

$$A_{804}=A_1 A_2 A_3 \tag{5}$$

In the formulas (5), the alignment coefficient $A_{801}$ of the image 801 is equal to "1". Since the image 801 is the base image for alignment, it is not converted. The alignment coefficients concerning the other images are found by multiplying the alignment coefficients of the image sets.

In FIG. 9B, images 811, 813, and 814 are aligned to a second image 812 as the base image for alignment after finding the alignment coefficients $A_1$, $A_2$, and $A_3$ of the image sets. Transformation matrices $A_{811}$ through $A_{814}$ of the images 811 through 814 are shown by the following formulas (6):

$$A_{811}=A_1^{-1}$$

$$A_{812}=1$$

$$A_{813}=A_2$$

$$A_{814}=A_2 A_3 \tag{6}$$

Since the image 811 is aligned to the second image 812, the alignment process is needed. Since the alignment coefficient $A_1$ in the image set is obtained assuming that the image 812 will be converted into the image 811, the actual alignment coefficient becomes an inverse matrix $A_1^{-1}$.

In FIG. 9C, images 821, 822, and 824 are aligned to a third image 823 as the base image for alignment after finding the alignment coefficients $A_1$, $A_2$, and $A_3$ of the image sets. Transformation matrices $A_{821}$ through $A_{824}$ of the images 821 through 824 are shown by the following formulas (7):

$$A_{821}=A_2^{-1} A_1^{-1}$$

$$A_{822}=A_2$$

$$A_{823}=1$$

$$A_{824}=A_3 \tag{7}$$

Since the images 821 and 822 are aligned to the image 823, it is necessary to find inverse matrices of the alignment coefficients $A_1$ and $A_3$. Moreover, the alignment coefficient $A_{821}$ of the image 821 is found by multiplying the alignment coefficient $A_1^{-1}$ for aligning the image 821 to the image 822 by the alignment coefficient $A_2^{-1}$ for aligning the image 822 to the image 823. The relationship between the coordinates $I_{821}$ through $I_{823}$ of the images 821 through 823 is shown by the following formula (8):

$$I_{823}=A_2^{-1} I_{822}=A_2^{-1} A_1^{-1} I_{821} \tag{8}$$

In FIG. 9D, images 831, 832, and 833 are aligned to a fourth image 824 as the base image for alignment after finding the alignment coefficients $A_1$, $A_2$, and $A_3$ of the image sets. Transformation matrices $A_{831}$ through $A_{834}$ of the images 831 through 834 are shown by the following formulas (9):

$$A_{831}=A_3^{-11} A_2^{-1} A_1^{-1}$$

$$A_{832}=A_3^{-1} A_2^{-1}$$

$$A_{833}=A_3^{-1}$$

$$A_{834}=1 \tag{9}$$

For example, when a first image shifts in a horizontal direction or a vertical direction due to inclination of the camera 100 during photography of the first image, or when a first image is affected by defocus or a camera shake, a base image is selected by changing the reference of alignment (the predetermined condition). Accordingly, even if the photography of the first image fails, a satisfactory image will be used as the base image for alignment. Moreover, a user's favorite image can be used as the base image for alignment.

In the foregoing description, the example for setting up a last image as the reference image used for calculating the alignment coefficient of an image set was described. On the other hand, when a feature amount, such as a moving amount, or a change of brightness, blur, or defocus, between images is less than a predetermined threshold, one or more last images may be set up as a reference image.

In FIG. 9E, a head image 841 is set up as a base image for alignment. In an image set of images 841 and 842, the head image 841 is set up as a reference image. Next, when an image set of an image 843 is set up, the feature amount that is a difference between the head image 841 and the image 843 is found. For example, at least one of a moving amount, and changes of brightness, blur, and defocus, between the images is used as the feature amount concerned. Then, the feature amount concerned is compared with the predetermined threshold.

When the feature amount is less than the threshold, the images 841 and 843 are set as an image set, and the image 841 becomes the reference image. On the other hand, when the feature amount of an image 844 to the base images 841 is equal to or greater than the threshold, the image 844 forms an image set with the image 843 as the reference image. Transformation matrices $A_{841}$ through $A_{844}$ of the images 841 through 844 are shown by the following formulas (10):

$$A_{841}=1$$

$$A_{842}=A_1$$

$$A_{843}=A'_2$$

$$A_{844}=A'_2 A_3 \qquad (10).$$

Thus, the first embodiment of the present invention enables the alignment of images with sufficient accuracy, even if a moving amount between the images becomes large in continuous photography. Furthermore, even if change between images becomes large because of a factor other than the moving amount, the images are aligned easily.

Subsequently, a camera 900 according to a second embodiment of the present invention will be described.

Figure 10:
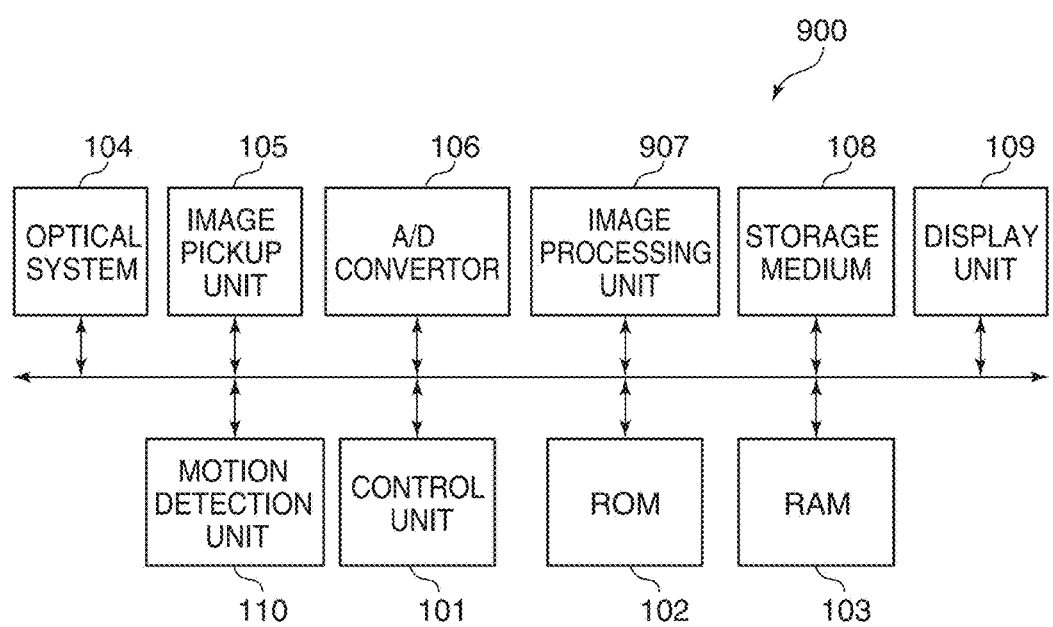
FIG. 10 is a block diagram schematically showing a configuration of a camera according to a second embodiment of the present invention.

FIG. 10 is a block diagram schematically showing a configuration of the camera 900 according to the second embodiment of the present invention. It should be noted that the same reference numerals are assigned to components in FIG. 10 that are the same as the components of the camera 100 shown in FIG. 1.

The illustrated camera 900 performs panoramic composition using the alignment process described in the first embodiment. Accordingly, since a process in an image processing unit differs from the process in the image processing unit 107 of the camera 100 shown in FIG. 1, a reference numeral 907 is assigned to the image processing unit in FIG. 10.

Figure 11:
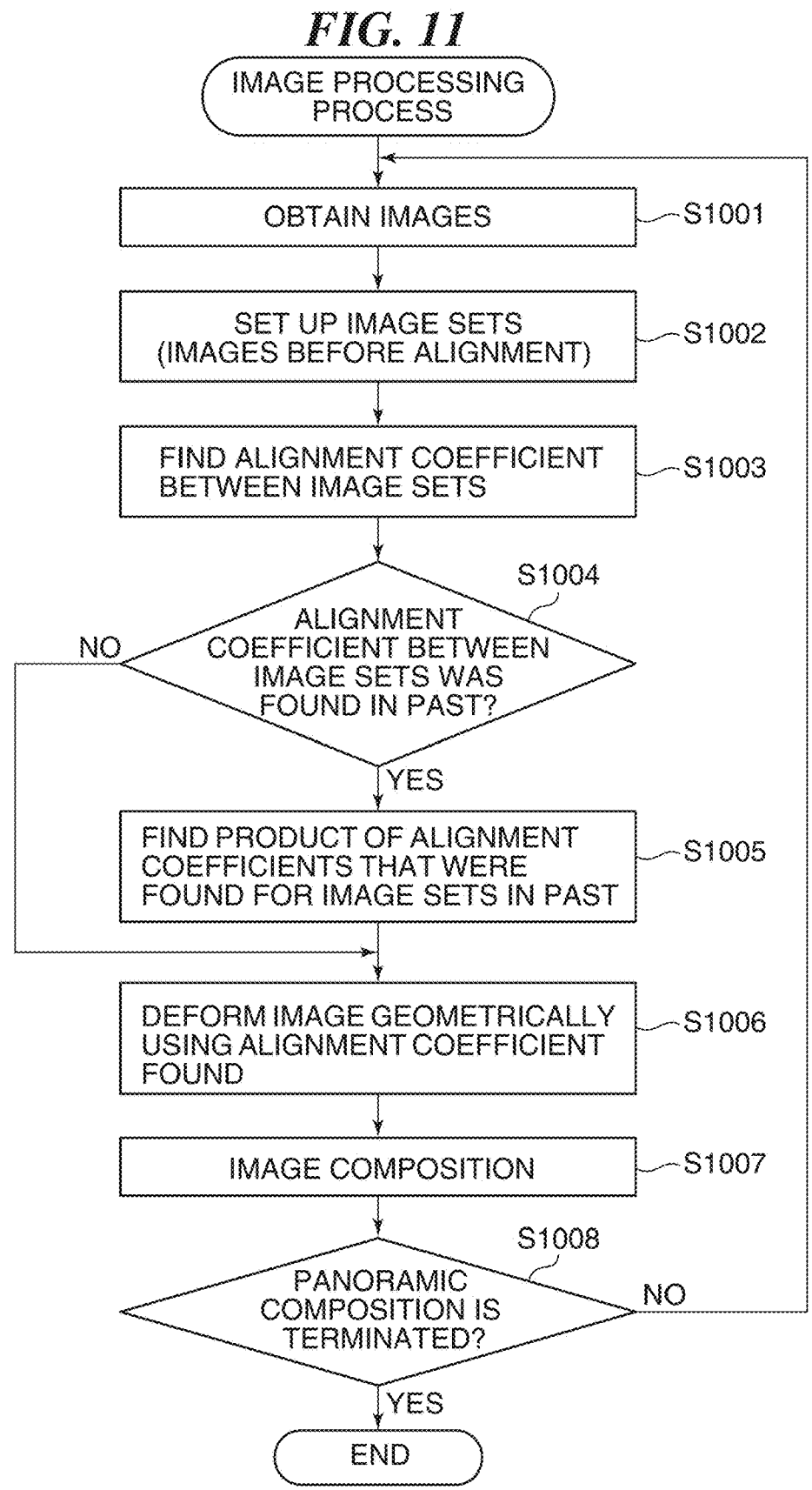
FIG. 11 is a flowchart showing an image processing process performed by the camera shown in FIG. 10.

FIG. 11 is a flowchart showing an image processing process performed by the camera 900 shown in FIG. 10. Since a process in steps S1001 through S1006 in FIG. 11 is identical to the process in the steps S201 through S206 in FIG. 3, a description of steps S1001 to S1006 is omitted.

After the process in the step S1006, the control unit 101 expands a field angle by performing the composition process near a boundary between images after the geometric deformation with the image processing unit 907 (step S1007). Then, the control unit 101 determines whether the panoramic composition is terminated (step S1008). When determining that the panoramic composition is not terminated (NO in the step S1008), the control unit 101 returns the process to the step S1001. On the other hand, when determining that the panoramic composition is terminated (YES in the step S1008), the control unit 101 finishes the image process.

When the process of the flowchart shown in FIG. 11 is performed, the images 401 through 407 shown in FIG. 2A form a panoramic image of which the field angle is expanded, as shown in FIG. 2C.

Figure 12:
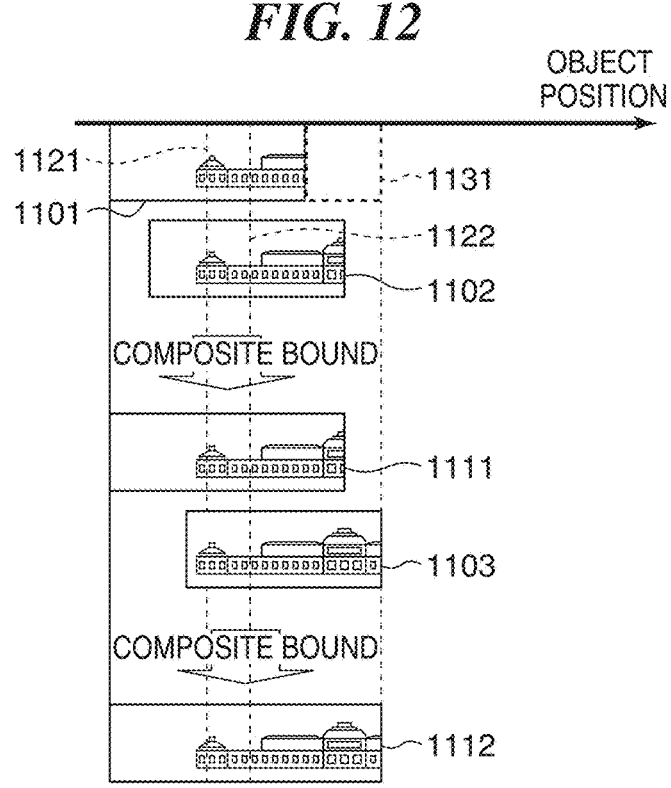
FIG. 12 is a view for describing a composition process in step S1007 in FIG. 11.

FIG. 12 is a view for describing the composition process (the panoramic composition process) in the step S1007 in FIG. 11.

When the alignment by the geometric deformation described in the step S1006, shown in FIG. 11, is performed, images 1101, 1102, and 1103 are obtained. Then, when the boundaries between the images 1101, 1102, and 1103 are composited in order, a panoramic composite image is obtained.

The images 1101 and 1102 are composited at a center line 1121 of the image 1101 in the horizontal direction as the boundary. For example, the image 1101 is allocated to the left area of the line 1121, and the image 1102 is allocated to the right area of the line 1121. On the line 1121, a process of mixing pixel data of the images 1101 and 1102 is performed in order to make a joint natural. For example, the pixel data of the images 1101 and 1102 are composited at 1:1 on the line 1121. Then, the ratio of the image 1101 on the left side of the line 1121 increases with distance from the line 1121. On the other hand, the ratio of the image 1102 is enlarged on the right side of the line 1121. As a result, a composite image 1111 is obtained.

Subsequently, the composite image 1111 and the image 1103 are composited. In this case, they are composited at a center line 1122 of the last image 1102 in the horizontal direction. As a result, a composite image 1112 is obtained.

Thus, a panoramic composite image is generated by compositing images at boundaries, in order, after alignment. Then, when the images 1102 and 1103 are panoramically composited to the image 1101, an area 1131 is added to the image 1101 that expands the field angle.

As mentioned above, in the second embodiment of the present invention, the panoramic composite image is generated by connecting the images to which the alignment process is performed to the images that are continuously taken during a moving operation of the camera 900, such as a panning operation.

Subsequently, one example of a camera 1200 according to a third embodiment of the present invention will be described.

Figure 13:
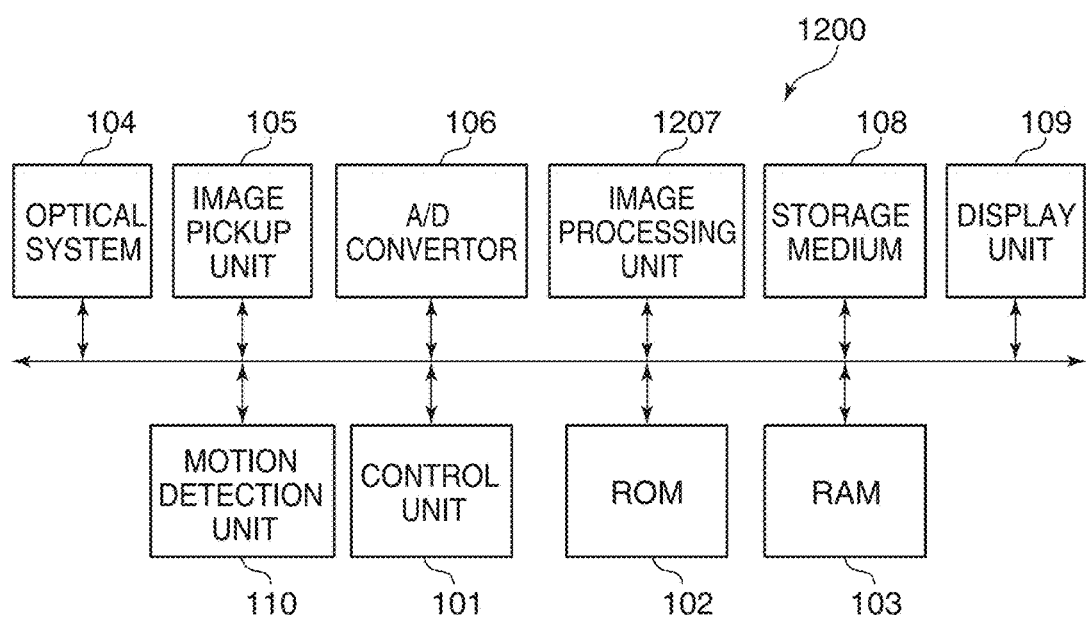
FIG. 13 is a block diagram schematically showing a configuration of a camera according to a third embodiment of the present invention.

FIG. 13 is a block diagram schematically showing a configuration of the camera 1200 according to the third embodiment of the present invention. It should be noted that the same reference numerals are assigned to components in FIG. 13 that are the same as the components of the camera 100 shown in FIG. 1.

The illustrated camera 1200 generates a full focus image that expands a depth of field by compositing a plurality of images that are taken while focusing on a plurality of objects of which distances from the camera 1200 are different (objects of which focusing distances differ) in order with using the alignment process described in the first embodiment. Accordingly, since a process in an image processing unit differs from the process in the image processing unit 107 of the camera 100 shown in FIG. 1, a reference numeral 1207 is assigned to the image processing unit in FIG. 13.

Figure 14:
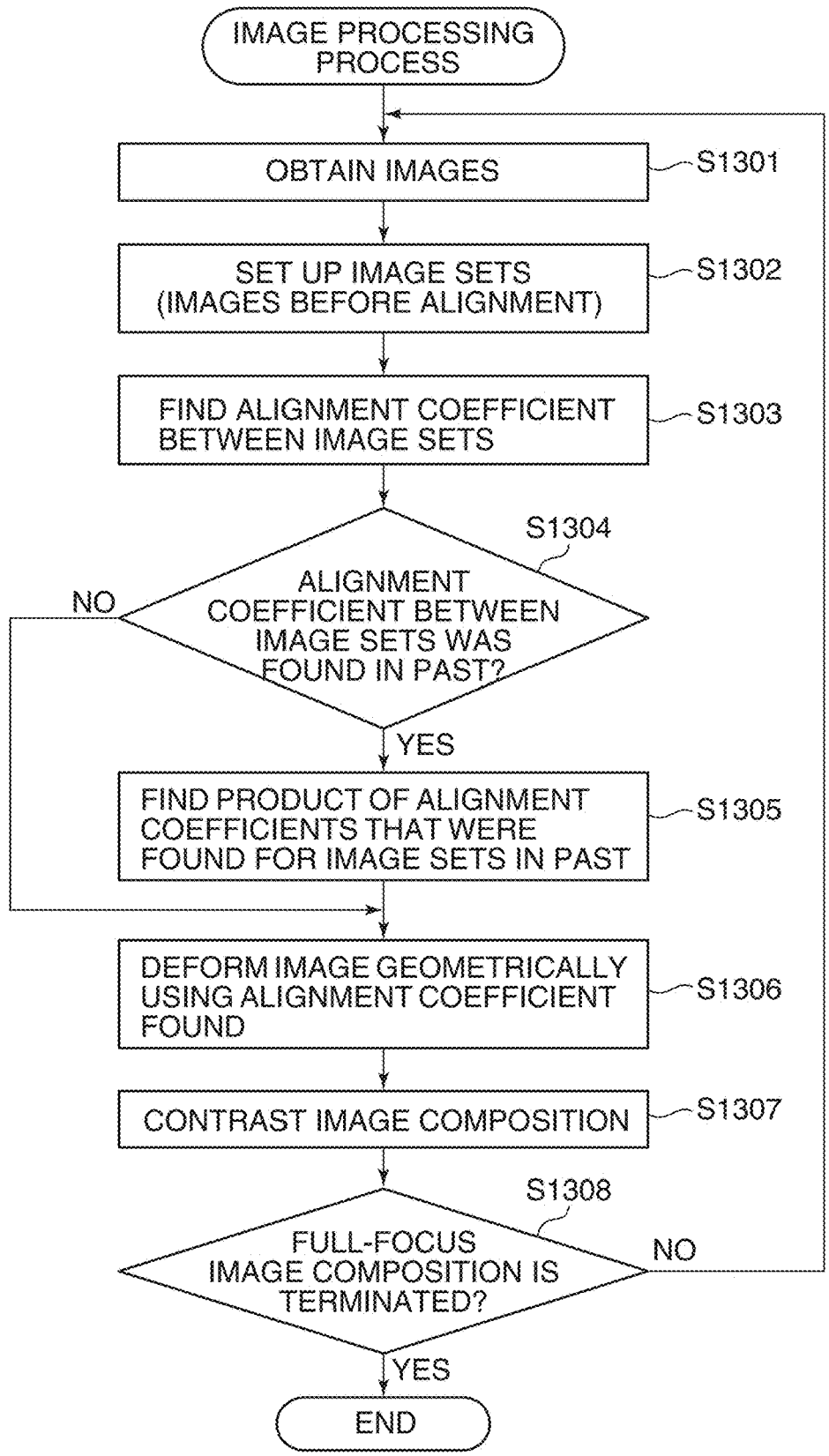
FIG. 14 is a flowchart showing an image processing process performed by the camera shown in FIG. 13.

FIG. 14 is a flowchart showing an image processing process performed by the camera 1200 shown in FIG. 13.

The control unit 101 photographs the objects while changing a distance to an object to be focused from the optical system 104 with the image pickup unit 1205, and obtains a plurality of images (step S1301).

Figure 15A:
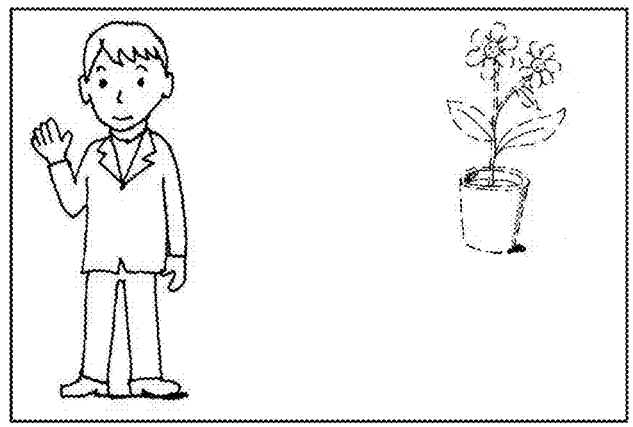
FIG. 15A and FIG. 15B are views showing images obtained by the camera shown in FIG. 13 while changing a focusing distance.
Figure 15B:
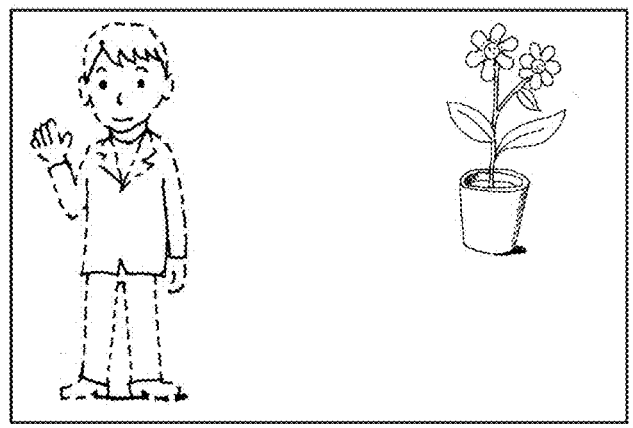
Figure 15C:
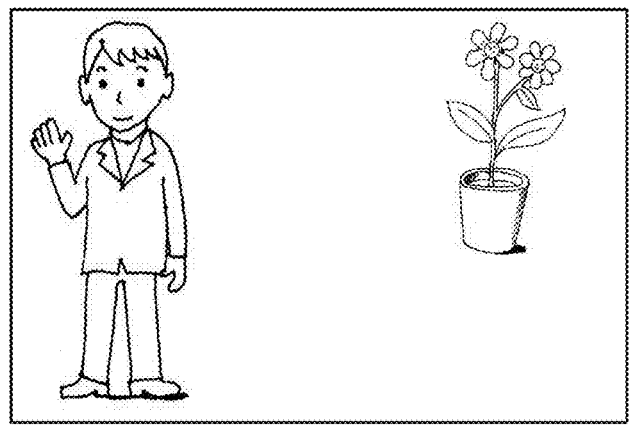
FIG. 15C is a view showing a full focus image that is obtained by compositing the images in FIG. 15A and FIG. 15B.

FIG. 15A and FIG. 15B are views showing images obtained by the camera 1200 shown in FIG. 13 while changing a focusing distance. FIG. 15C is a view showing a full focus image that is obtained by compositing the images in FIG. 15A and FIG. 15B.

FIG. 15A shows an image that is taken while focusing on a front person as a target object. Accordingly, since the focusing distance to a back plant, as a background object, is deviated, the background object concerned is out of focus. On the other hand, FIG. 15B shows an image that is taken while focusing on the back plant as the background object. Accordingly, the person that is the target object is out of focus.

Referring back to FIG. 14, the control unit 101 performs a process in steps S1302 through S1306 about an image of which the focusing distance differs. The process in the steps S1302 through S1306 is the same as the process in the steps S202 through S206 that was described in FIG. 3.

It should be noted that an image of which a defocus amount or a camera shake is small may be used as a base image for alignment instead of an image obtained by first photography when a product of alignment coefficients is found in the step S1305. Moreover, an image that focuses on a target object may be used as a base image.

There is a known method that estimates a Point Spread Function (PSF) that is a defocus function as a method of detecting a defocus amount or a camera shake (see Japanese Laid-Open Patent Publication (Kokai) No. 2014-219725 (JP 2014-219725A)). In the estimate of the PSF, a luminance value that is obtained by differentiating image data before performing a correction process is compared with a threshold. Then, an area where the luminance value is less than the threshold and where a sign of a pre-correction luminance value of image data is reverse to a sign of a luminance value of post-correction image data is extracted. Furthermore, when a reverse edge component of the extracted area is obtained, the PSF that indicates a defocus state (amount) is obtained.

After the process in the step S1306, the control unit 101 composites the area focused on the main object and the area focused on the background object in the post-alignment images with the image processing unit 1207 (step S1307). As a result, an image of which a depth of field is expanded about the composite area is obtained.

For example, a contrast composition is employed in the process in the step S1307. Details of the contrast composition will be described later.

Subsequently, the control unit 101 determines whether a series of the full-focus-image compositions are terminated (step S1308). When determining that the full-focus-image compositions are not terminated (NO in the step S1308), the control unit 101 returns the process to the step S1301. On the other hand, when determining that the full-focus-image compositions are terminated (YES in the step S1008), the control unit 101 finishes the image process.

When the images shown in FIG. 15A and FIG. 15B are composited by performing the process described in FIG. 14, the full focus image that focuses on both the target object and the background object is generated, as shown in FIG. 15C. It should be noted that the number of images that are composited is not limited to two. A full focus image may be generated by compositing three or more images that were taken while changing the focusing distance by performing the contrast composition.

The contrast composition noted above will be described below. Images that are subjected to the contrast composition (also referred to as composition target images) are post-alignment images. Moreover, when the contrast composition was performed in the last frame, the composite image of the last frame becomes a reference image of the composition (also referred to as a composition reference image). Then, when the contrast composition was not performed, the last frame becomes the composition reference image.

In the contrast composition, the focusing degrees about the composition reference image and the composition target image are found. A high frequency component is obtained from a pixel area around a target pixel, and the absolute value of the high frequency component concerned becomes the focusing degree.

As mentioned above, the focusing degrees are respectively found about the composition reference image and the composition target image (referred to as a reference-image focusing degree and a target-image focusing degree). Then, a focusing degree difference $\Delta$ between the reference-image focusing degree and the target-image focusing degree is found ($\Delta$="target-image focusing degree"−"reference-image focusing degree"). After that, weights of the composition reference image and the composition target image are adjusted according to the focusing degree difference $\Delta$, and then the composition process is performed.

Figure 16A:
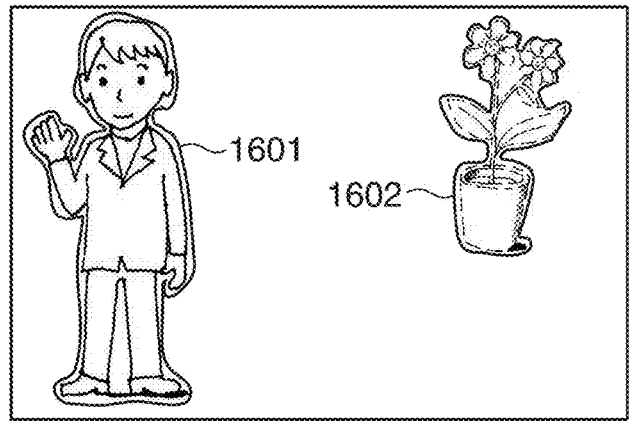
FIG. 16A and FIG. 16B are views respectively showing a composition reference image and a composition target image that are obtained by the camera shown in FIG. 13.
Figure 16B:
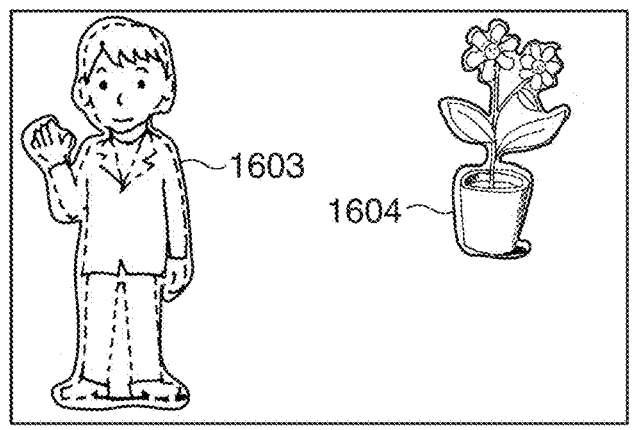
Figure 16C:
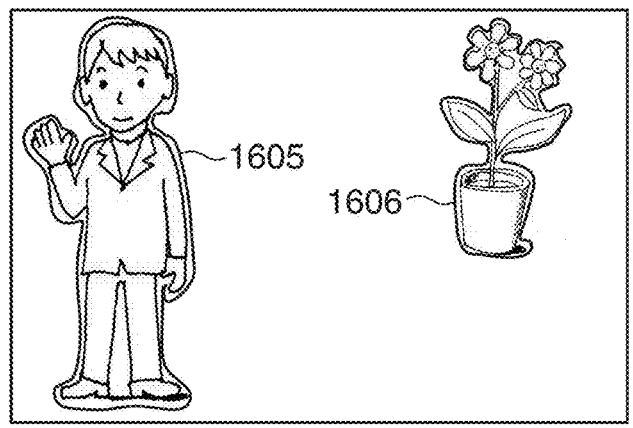
FIG. 16C is a view showing a full focus image that is obtained by compositing the images in FIG. 16A and FIG. 16B.

FIG. 16A is a view showing the composition reference image obtained with the camera shown in FIG. 13, and FIG. 16B is a view showing the composition target image. Moreover, FIG. 16C is a view showing the full focus image that is obtained by compositing the images in FIG. 16A and FIG. 16B.

Areas 1601 and 1603 in FIG. 16A and FIG. 16B are front person areas in the composition reference image and the composition target image, respectively. Since the person area is focused in the composition reference image shown in FIG. 16A, the greater frequency component is detected in the person area 1601 of the composition reference image as compared with the person area 1603 of the composition target image shown in FIG. 16B. Then, the focusing degree in the area 1601 of the composition reference image is greater than the focusing degree in the area 1603 of the composition target image. For example, assuming that the reference-image focusing degree is "10" and the target-image focusing degree is "5", the focusing degree difference $\Delta$ will become "−5".

Figure 17:
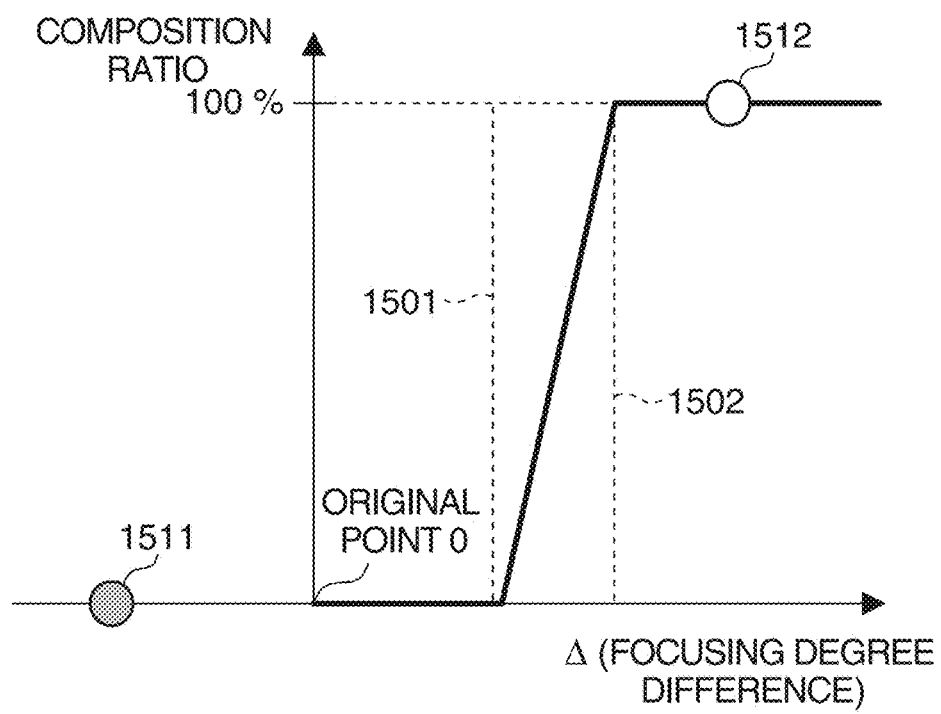
FIG. 17 is a graph showing an example of a composition ratio of the composite target image used when a full focus image is generated in the camera shown in FIG. 13.

FIG. 17 is a graph showing an example of a composition ratio of the composite target image used when a full focus image is generated in the camera 1200 shown in FIG. 13.

In FIG. 17, a horizontal axis indicates the focusing degree difference $\Delta$, and a vertical axis indicates the composition ratio w of the composition target image. The composition ratio w corresponding to the focusing degree difference $\Delta$ in the areas 1601 and 1603, shown in FIG. 16A and FIG. 16B, respectively, is "0" as shown by a reference numeral 1511, and the signal values of the pixels included in the area 1603 of the composition target image are not used for composition. In this case, an area 1605 of the full focus image shown in FIG. 16C consists of only signal values of the pixels included in the area 1601 of the composition reference image.

Thus, the smaller the composition ratio w is, the lower the focusing degree of the composition target image to the composition reference image is. When the contrast composition is performed with using the composition ratio w, the following formula (11) is used:

$$Bc = wBt + (1-w)Bs \qquad (11).$$

It should be noted that Bc, Bt, and Bs indicate signal values of pixels or a pixel area in the contrast-composition image, a composition target image, and a composition reference image, respectively.

Areas 1602 and 1604 shown in FIG. 16A and FIG. 16B are background plant areas in the composition reference image and the composition target image, respectively. Then, the focusing degree in the area 1604 of the composition target image is greater than the focusing degree in the area 1602 of the composition reference image. For example, assuming that the reference-image focusing degree is "5" and the target-image focusing degree is "10", the focusing degree difference Δ will become "5".

The composition ratio w in this case is "1" (equivalent to 100%) as shown by a reference numeral 1512. The composition process is performed so that the ratio of the signal values in the area 1604 of the composition target image becomes 100%. That is, an area 1606 in FIG. 16C consists of only signal values of the pixels included in the area 1604.

Furthermore, the composition reference image and the composition target image is composited by weighting both the images in a section between a lower limit threshold 1501 and an upper limit threshold 1502 of the focusing degree difference Δ. The lower limit threshold and the upper limit threshold are set up on the basis of experimental values, for example. It should be noted that the lower limit threshold and the upper limit threshold may be changed according to object distance or settings of the camera 1200.

As mentioned above, in the third embodiment of the present invention, a full focus image is obtained by performing the contrast composition after aligning images that are obtained as a result of photography while changing the focusing distance.

As is clear from the above description, the control unit 101 and the image processing unit 107 function as a first calculation unit, a second calculation unit, a processing unit, and a composition unit in the example shown in FIG. 1.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the functions of the above-mentioned embodiments may be achieved as a control method that is executed by the image processing apparatus. Moreover, the functions of the above-mentioned embodiments may be achieved as a control program that is executed by a computer with which the image processing apparatus is provided.

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

What is claimed is:

1. An image processing apparatus comprising:
at least one memory configured to store instructions; and
at least one processor in communication with the at least one memory and configured to execute the instructions:
(a) to set up a plurality of image sets according to a predetermined rule using a plurality of images obtained by continuous photography;
(b) to calculate a first conversion coefficient corresponding to a moving amount of an object between images in each of the plurality of image sets;
(c) to calculate a second conversion coefficient used for an alignment process about a correction target image other than a base image included in the plurality of images by multiplying a plurality of first conversion coefficients; and
(d) to generate an alignment image in which the object in the correction target image is aligned to the object in the base image by applying a conversion process to the correction target image using the second conversion coefficient.

2. The image processing apparatus according to claim 1, wherein a geometric deformation is employed as the conversion process.

3. The image processing apparatus according to claim 1, wherein the at least one processor further executes the instructions (e) to obtain a composite image by compositing the alignment image and the base image.

4. The image processing apparatus according to claim 3, wherein the plurality of images are obtained by the continuous photography during one of a panning operation and a tilting operation of a camera.

5. The image processing apparatus according to claim 3, wherein the plurality of images are obtained by the continuous photography while focusing on a plurality of objects of which distances from the image processing apparatus are different in order.

6. The image processing apparatus according to claim 1, wherein the at least one processor further executes the instructions (e) to set up an image set so that a difference between images is less than a predetermined value.

7. The image processing apparatus according to claim 1, wherein the base image is selected from the plurality of images according to a predetermined condition.

8. A control method for controlling an image processing apparatus having at least one memory configured to store instructions, and at least one processor in communication with the at least one memory and configured to execute the instructions to perform the control method, the control method comprising:

setting up a plurality of image sets according to a predetermined rule using a plurality of images obtained by continuous photography;

calculating a first conversion coefficient corresponding to a moving amount of an object between images in each of the plurality of image sets;

calculating a second conversion coefficient used for an alignment process about a correction target image other than a base image included in the plurality of images by multiplying a plurality of first conversion coefficients; and generating an alignment image in which the object in the correction target image is aligned to the object in the base image by applying a conversion process to the correction target image using the second conversion coefficient.

9. A non-transitory computer-readable storage medium storing a control program causing a computer to execute a control method for controlling an image processing apparatus having at least one memory configured to store instructions, and at least one processor in communication with the at least one memory and configured to execute the instructions to perform the control method, the control method comprising:

setting up a plurality of image sets according to a predetermined rule using a plurality of images obtained by continuous photography;

calculating a first conversion coefficient corresponding to a moving amount of an object between images in each of the plurality of image sets;

calculating a second conversion coefficient used for an alignment process about a correction target image other than a base image included in the plurality of images by multiplying a plurality of first conversion coefficients; and generating an alignment image in which the object in the correction target image is aligned to the object in the base image by applying a conversion process to the correction target image using the second conversion coefficient.

10. The image processing apparatus according to claim 3, wherein a depth of field of the composite image is larger than a depth of field of any one of the plurality of the images.

11. The image processing apparatus according to claim 3, wherein a depth of field of a composite area of the composite image is larger than of a depth of field of any one area, corresponding to the composite area, of the plurality of images.

12. The control method according to claim 8, wherein a geometric deformation is employed as the conversion process.

13. The control method according to claim 8, further comprising obtaining a composite image by compositing the alignment image and the base image.

14. The control method according to claim 13, wherein a depth of field of the composite image is larger than a depth of field of any one of the plurality of the images.

15. The control method according to claim 13, wherein a depth of field of a composite area of the composite image is larger than of a depth of field of any one area, corresponding to the composite area, of the plurality of images.

16. The control method according to claim 13, wherein the plurality of images are obtained by the continuous photography during one of a panning operation and a tilting operation of a camera.

17. The control method according to claim 13, wherein the plurality of images are obtained by the continuous photography while focusing on a plurality of objects of which distances from the image processing apparatus are different in order.

18. The control method according to claim 8, further comprising setting up step of setting up an image set so that a difference between images is less than a predetermined value.

19. The control method according to claim 8, wherein the base image is selected from the plurality of images according to a predetermined condition.

20. The non-transitory computer-readable storage medium according to claim 9, wherein a geometric deformation is employed as the conversion process.

21. The non-transitory computer-readable storage medium according to claim 9, wherein the method further comprises obtaining a composite image by compositing the alignment image and the base image.

22. The non-transitory computer-readable storage medium according to claim 21, wherein a depth of field of the composite image is larger than a depth of field of any one of the plurality of the images.

23. The non-transitory computer-readable storage medium according to claim 21, wherein a depth of field of a composite area of the composite image is larger than of a depth of field of any one area, corresponding to the composite area, of the plurality of images.

24. The non-transitory computer-readable storage medium according to claim 21, wherein the plurality of images are obtained by the continuous photography during one of a panning operation and a tilting operation of a camera.

25. The non-transitory computer-readable storage medium according to claim 21, wherein the plurality of images are obtained by the continuous photography while focusing on a plurality of objects of which distances from the image processing apparatus are different in order.

26. The non-transitory computer-readable storage medium according to claim 9, wherein the method further comprises setting up an image set so that a difference between images is less than a predetermined value.

27. The non-transitory computer-readable storage medium according to claim 9, wherein the base image is selected from the plurality of images according to a predetermined condition.

* * * * *